US008712761B2

(12) United States Patent
Eldawy

(10) Patent No.: US 8,712,761 B2
(45) Date of Patent: Apr. 29, 2014

(54) TECHNIQUES FOR PERFORMING TRANSLATION OF MESSAGES

(75) Inventor: Mohamed Eldawy, Mountain View, CA (US)

(73) Assignee: Google Inc., Mountain View, CA (US)

(*) Notice: Subject to any disclaimer, the term of this patent is extended or adjusted under 35 U.S.C. 154(b) by 325 days.

(21) Appl. No.: 13/302,283

(22) Filed: Nov. 22, 2011

(65) Prior Publication Data
US 2013/0132066 A1 May 23, 2013

(51) Int. Cl.
*G06F 17/27* (2006.01)

(52) U.S. Cl.
USPC ............ 704/9; 704/2; 704/277; 704/3; 704/4; 704/5; 704/8; 382/182; 434/157; 707/793; 715/201; 715/264; 717/104

(58) Field of Classification Search
CPC .............. G06F 17/2836; G06F 17/248; G06F 17/2827; G06F 17/241; G06F 17/28; G10L 15/22
USPC ........... 382/182; 434/157; 704/2, 277, 3, 4, 5, 704/8; 707/793; 715/201, 264; 717/104
See application file for complete search history.

(56) References Cited

U.S. PATENT DOCUMENTS

| | | | | | |
|---|---|---|---|---|---|
| 4,980,829 | A | * | 12/1990 | Okajima et al. | 704/5 |
| 5,243,519 | A | * | 9/1993 | Andrews et al. | 704/8 |
| 5,442,546 | A | * | 8/1995 | Kaji et al. | 704/4 |
| 5,583,761 | A | * | 12/1996 | Chou | 715/201 |
| 5,697,789 | A | * | 12/1997 | Sameth et al. | 434/157 |
| 6,470,306 | B1 | * | 10/2002 | Pringle et al. | 704/3 |
| 6,526,426 | B1 | * | 2/2003 | Lakritz | 715/264 |
| 6,917,920 | B1 | * | 7/2005 | Koizumi et al. | 704/277 |
| 7,050,979 | B2 | * | 5/2006 | Mizutani et al. | 704/277 |
| 7,117,223 | B2 | | 10/2006 | Koizumi et al. | |
| 7,124,073 | B2 | * | 10/2006 | Tokuda et al. | 704/2 |
| 7,627,479 | B2 | * | 12/2009 | Travieso et al. | 704/277 |
| 7,711,544 | B2 | * | 5/2010 | McEntee et al. | 704/4 |
| 8,031,943 | B2 | * | 10/2011 | Chen et al. | 382/182 |
| 8,073,872 | B2 | * | 12/2011 | Fukata et al. | 707/793 |
| 8,296,123 | B2 | * | 10/2012 | Thayer et al. | 704/2 |
| 8,407,040 | B2 | * | 3/2013 | Sata et al. | 704/2 |
| 2002/0152063 | A1 | * | 10/2002 | Tokieda et al. | 704/2 |
| 2006/0156278 | A1 | * | 7/2006 | Reager | 717/104 |

FOREIGN PATENT DOCUMENTS

EP 2261818 A1 12/2010

* cited by examiner

*Primary Examiner* — Michael Colucci
(74) *Attorney, Agent, or Firm* — Remarck Law Group PLC

(57) ABSTRACT

Techniques for providing a translation environment interface to a user are disclosed herein. The techniques include receiving a message template to be translated, the message template including a text portion and one or more template placeholders, parsing the message template to identify the text portion and the template placeholders, generating non-editable objects corresponding to the template placeholders and generating a display message template by replacing each of the one or more template placeholders with its corresponding non-editable object in the message template, the display message template including the text portion to be translated. The techniques further include providing the display message template to a user device and receiving a translated display message template from the user device, the translated message including a translated text portion and the one or more non-editable objects. The techniques further include generating a translated message template based on the translated display message template.

19 Claims, 9 Drawing Sheets

TECHNIQUES FOR PERFORMING TRANSLATION OF MESSAGES

FIELD

The present disclosure generally relates to techniques for performing translation of messages.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many computer applications, including websites, generate messages to output to a user. Application providers want to be able to reach the largest audience possible, while also providing a comfortable user environment. Accordingly, application providers want to be able to generate messages in as many different languages as possible. Application providers may use human translators to translate messages from a source language to one or more target languages. Accordingly, it may be beneficial to provide the translators with an environment for performing translation of messages.

SUMMARY

This section provides a general summary of the disclosure, and is not a comprehensive disclosure of its full scope or all of its features.

In various embodiments of the present disclosure a computer-implemented technique is disclosed. The technique includes receiving, at a computing device having one or more processors, a message template to be translated from a source language to a target language. The message template includes a text portion and one or more template placeholders. The message template is used to generate a customized output message by replacing the one or more template placeholders with customized content. The technique further includes parsing, at the computing device, the message template to identify the text portion and the one or more template placeholders, and generating, at the computing device, one or more non-editable objects. Each of the one or more non-editable objects corresponds to one of the one or more template placeholders. The technique also includes associating each one of the one or more non-editable objects to its corresponding template placeholder of the one or more template placeholders, and generating, at the computing device, a display message template by replacing each of the one or more template placeholders with its corresponding non-editable object in the message template, the display message template including the text portion to be translated. The technique also includes providing, from the computing device, the display message template to a user device, and receiving, at the computing device, a translated display message template from the user device, the translated message including a translated text portion and the one or more non-editable objects, the translated text portion being in the target language and corresponding to the text portion of the message template. The technique also includes generating, at the computing device, a translated message template based on the translated display message template, the translated message template including the translated text portion and the one or more template placeholders.

In various embodiments of the present disclosure a computer-implemented technique is disclosed. The technique includes a message template datastore that stores a plurality of message templates to be translated and a message template retrieval module configured to retrieve a message template to be translated of the plurality of message templates to be translated from the message template datastore. The message template is to be translated from a source language to a target language, and includes a text portion and one or more template placeholders. The technique also includes a parsing module that parses the message template to be translated to identify the text portion and the one or more template placeholders. The technique also includes a display message template generation module configured to generate one or more non-editable objects. Each of the one or more non-editable objects corresponds to one of the one or more template placeholders, and generates a display message template by replacing each of the one or more template placeholders with its corresponding non-editable object in the message template. The display message template includes the text portion. The technique also includes a translator interface module configured that provides for display at a user device the display message template, and that receives a translated display message template from the user device. The translated message includes a translated text portion and the one or more non-editable objects, the translated text portion being in the target language and corresponding to the text portion of the message template to be translated. The technique also includes a message template generation module that generates a translated message template based on the translated display message template and the one or more template placeholders, the translated message template including the translated text portion and the one or more template placeholders.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 7A:
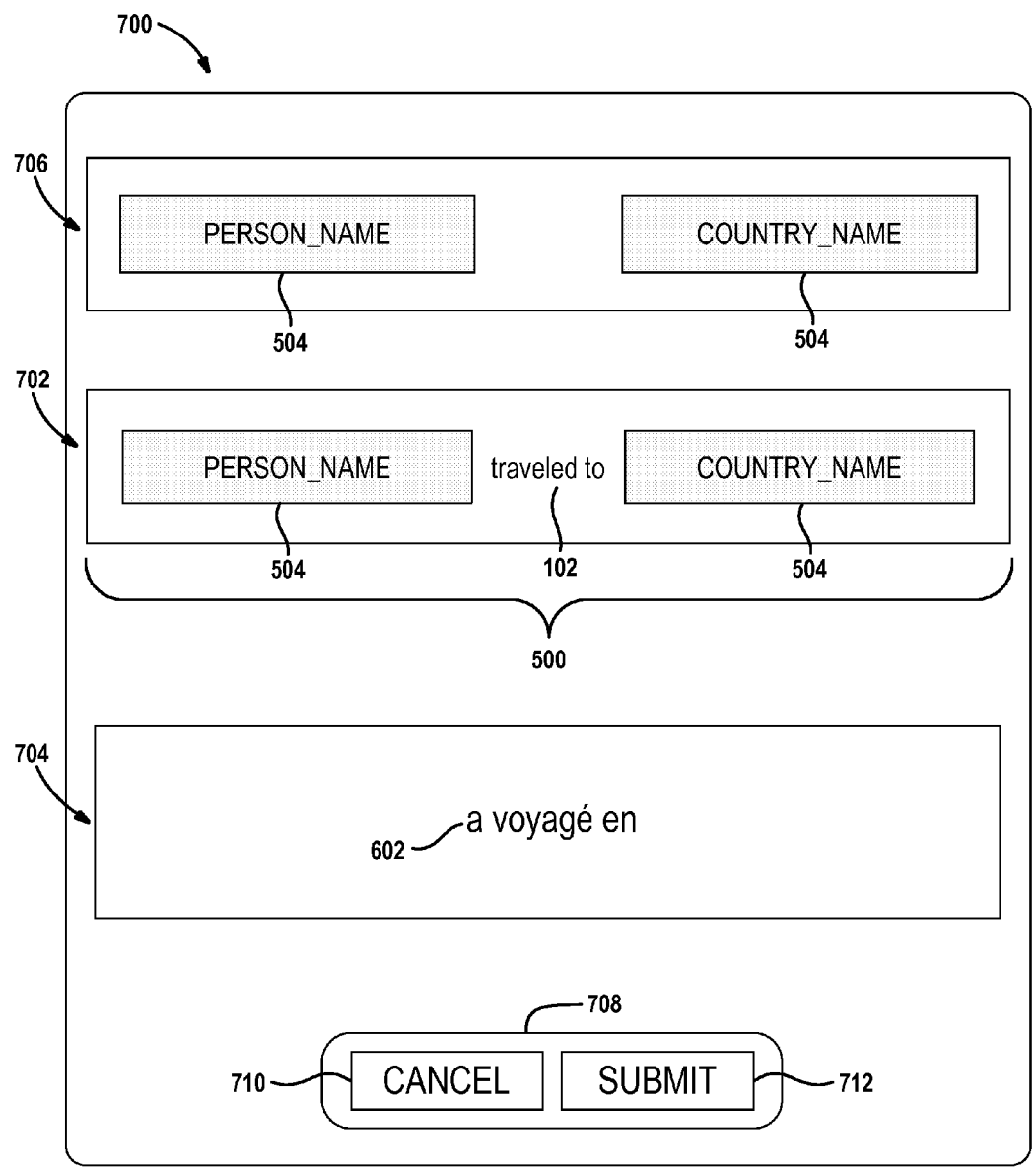
Figure 7B:
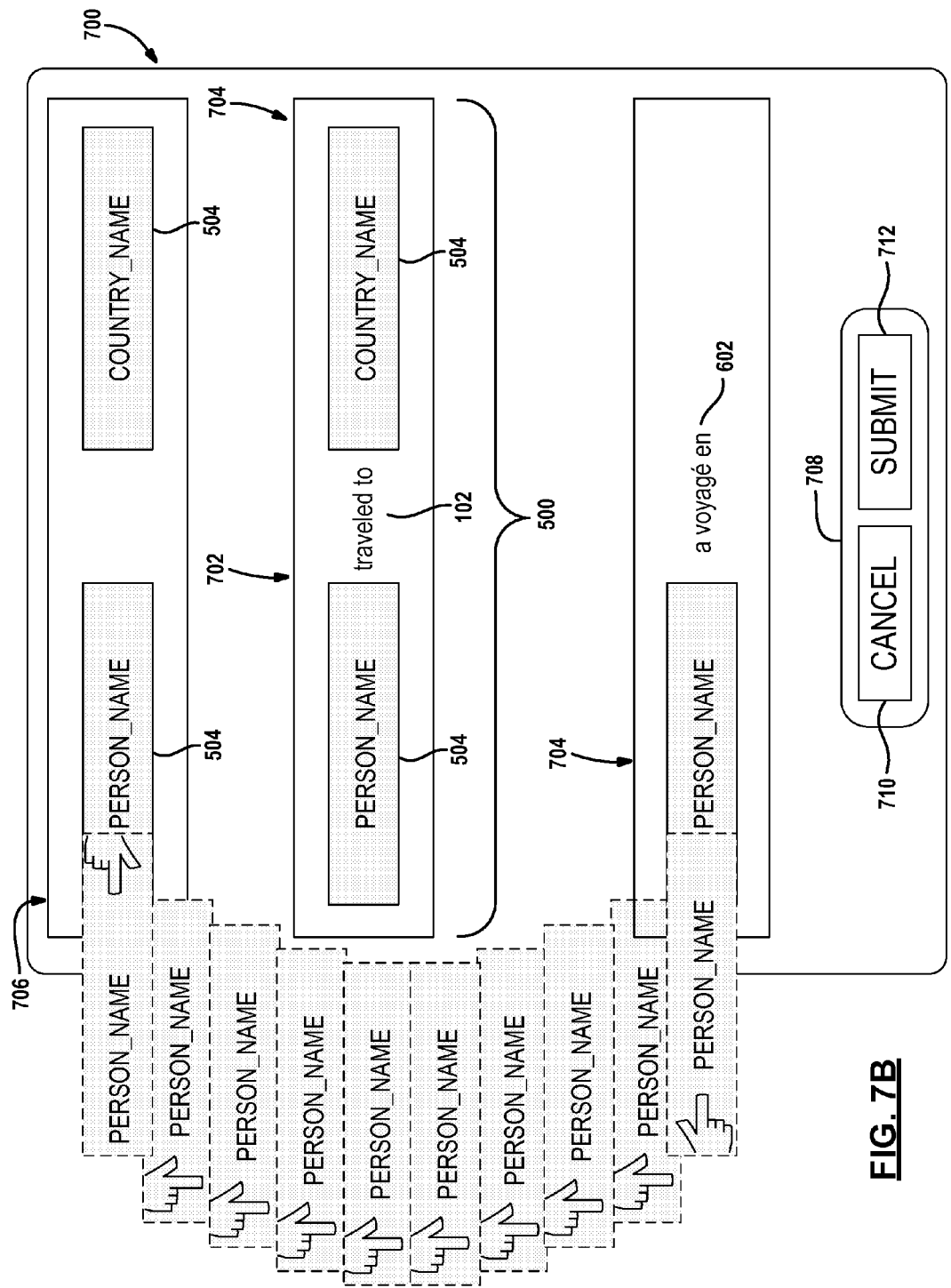
Figure 7C:
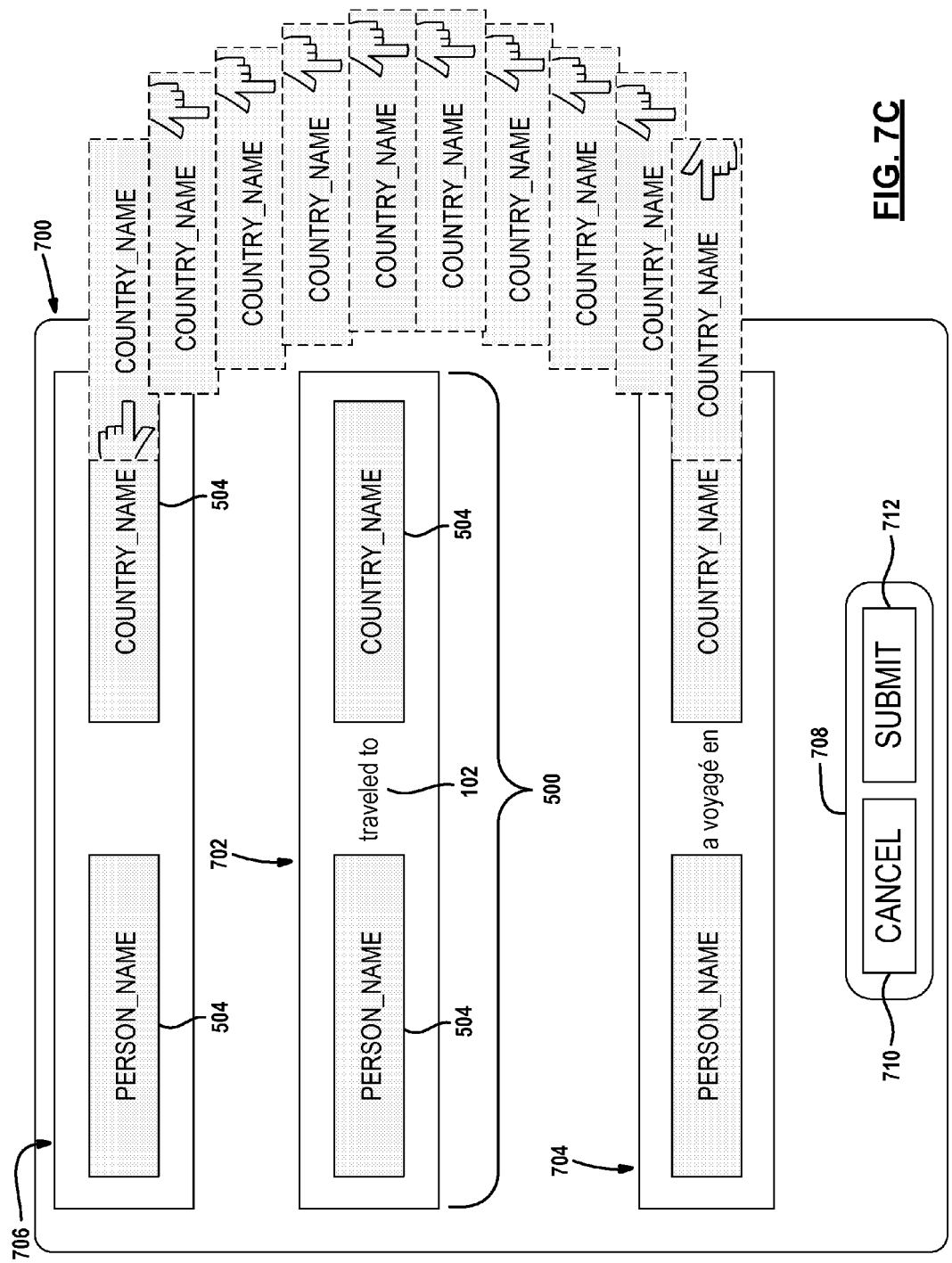
Figure 8:
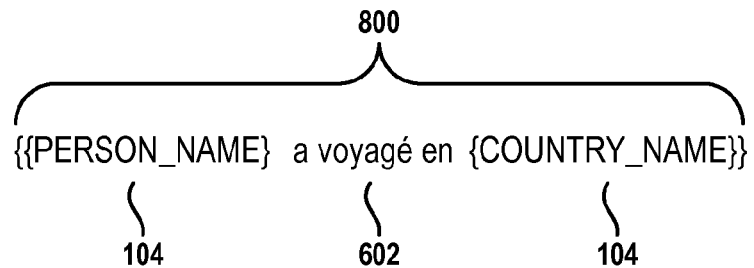
Figure 9:
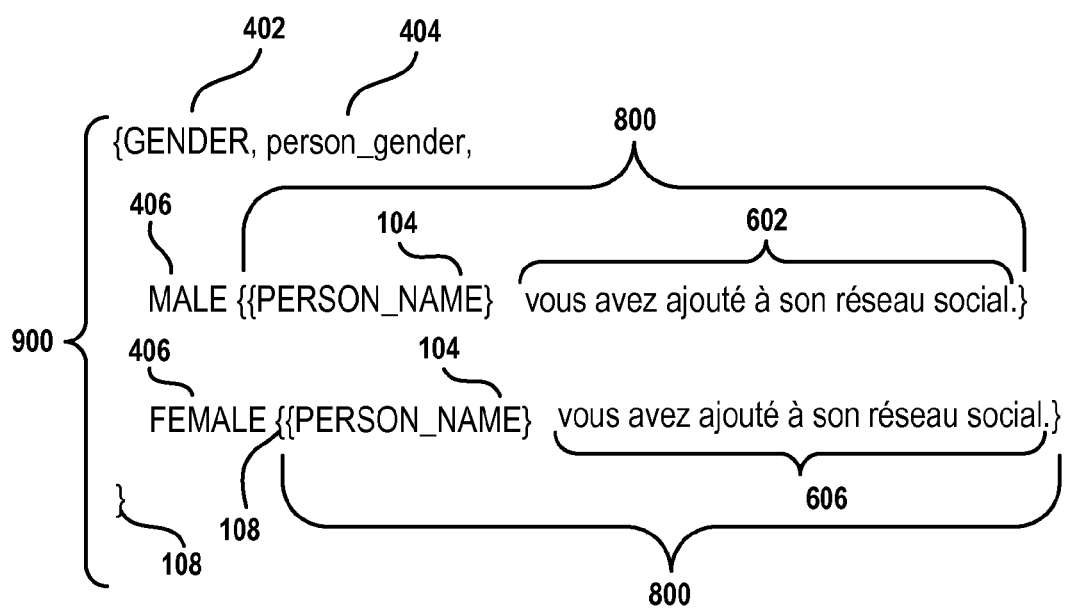
Figure 10A:
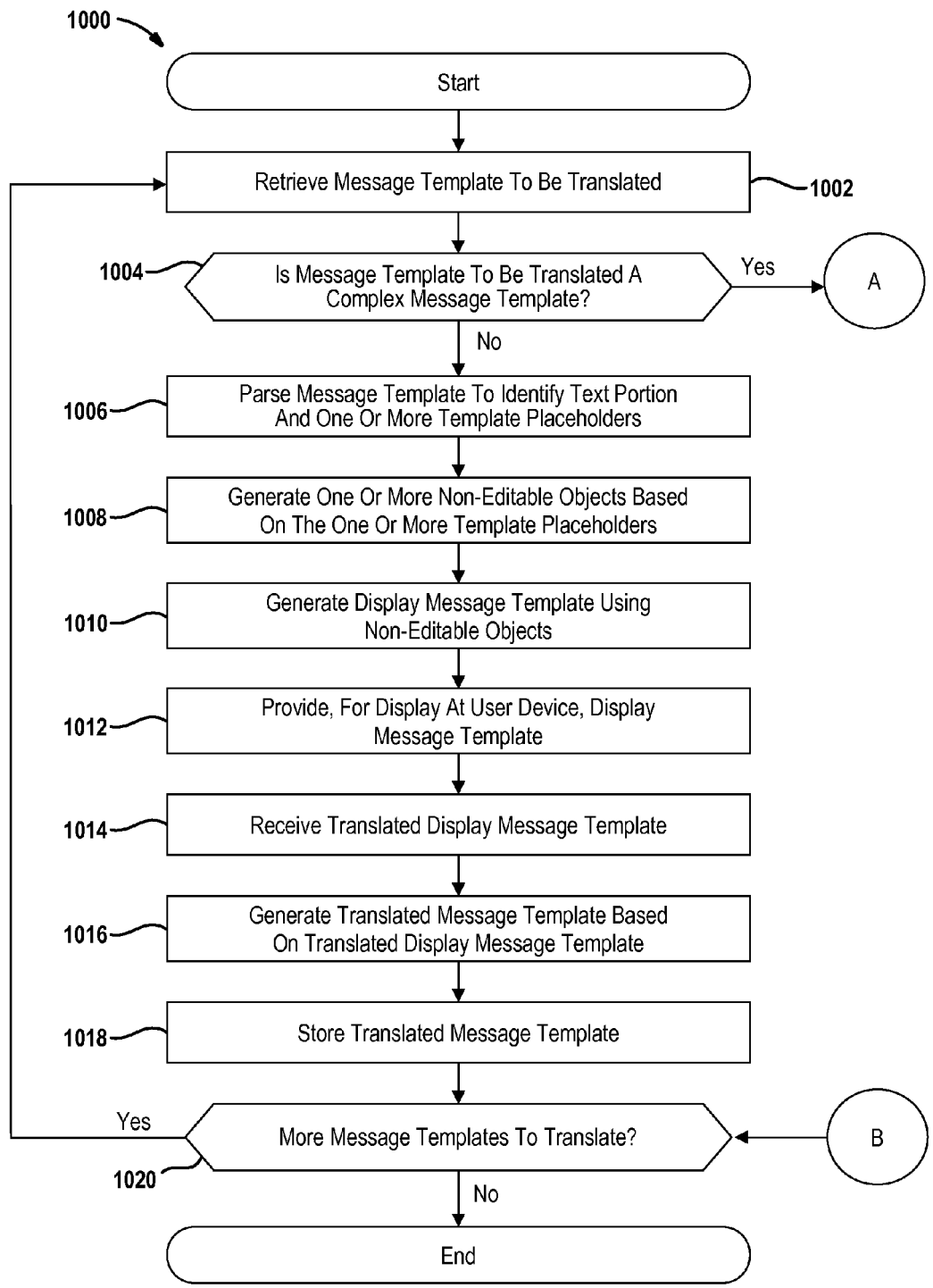
Figure 10B:
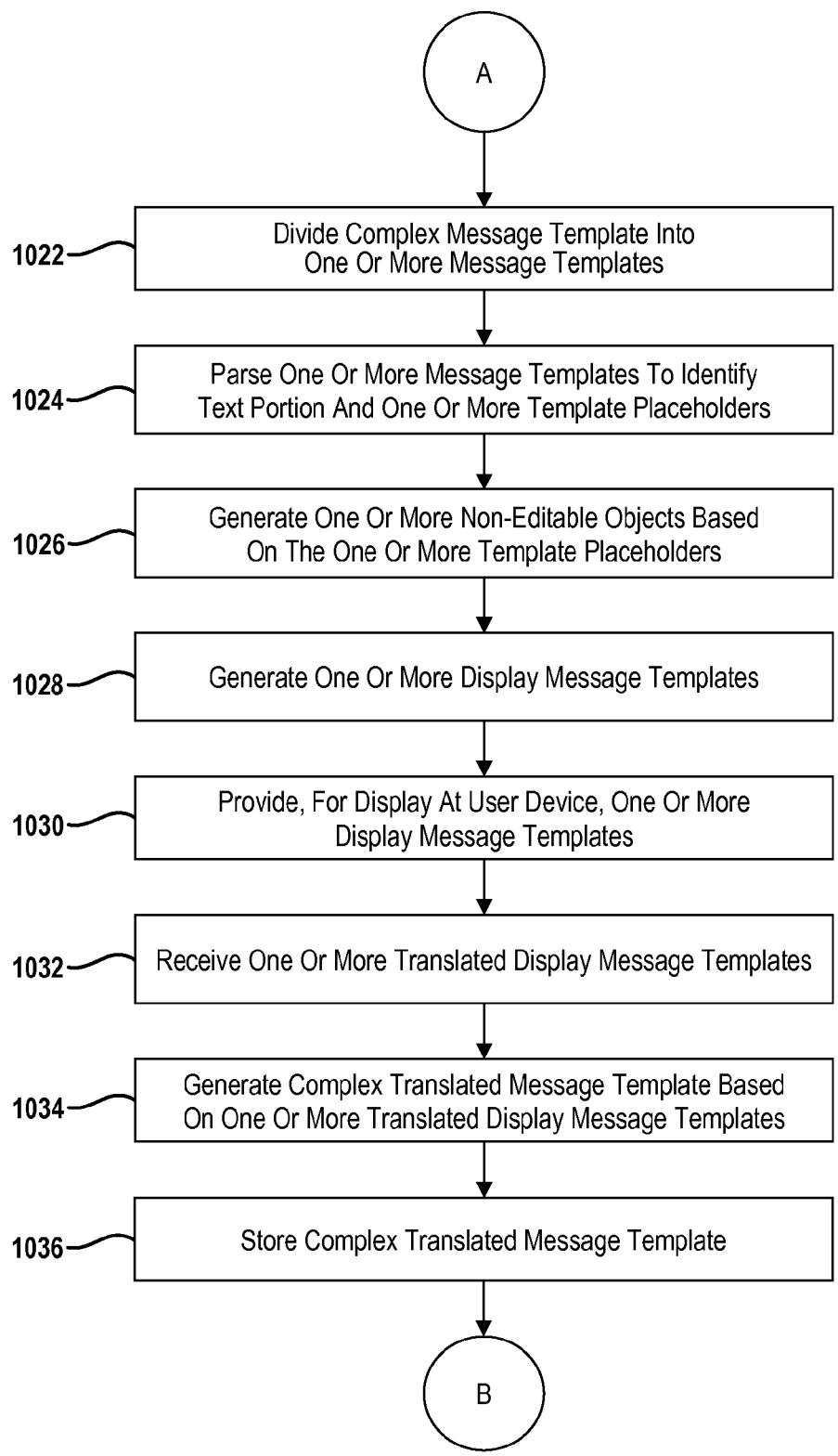

FIGS. 7A-C are illustrations of an example of a graphical user interface (GUI) that may be generated by the translation environment server according to some embodiments of the present disclosure;

FIG. 8 is an illustration of an example of a translated message template according to some embodiments of the present disclosure;

FIG. 9 is an illustration of an example of a translated complex message template according to some embodiments of the present disclosure; and FIGS. 10A-B is a flow chart illustrating a method for honoring a request for performing translation of message templates according to some embodiments of the present disclosure.

Corresponding reference numerals indicate corresponding parts throughout the several views of the drawings.

DETAILED DESCRIPTION

Example embodiments will now be described more fully with reference to the accompanying drawings.

Figure 1:
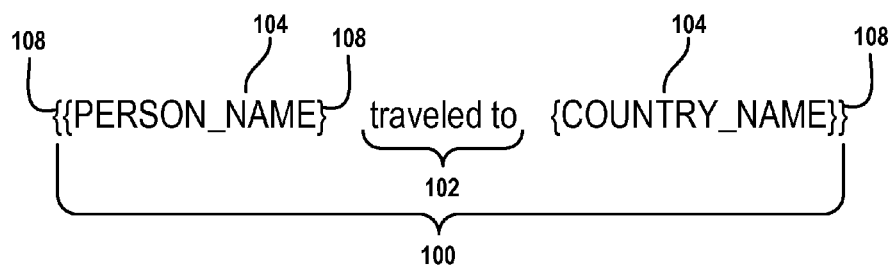
FIG. 1 is an illustration of an example of a message template according to some embodiments of the present disclosure.

As described above, computer applications may generate messages to communicate with a user. Many applications utilize message templates to generate such outgoing messages, which provide the appearance of customization to the users. FIG. 1 illustrates an example of a message template 100. The message template 100 is a structure that may contain a text portion 102 and one or more placeholders 104. It is noted that the text portion 102 may be continuous or non-continuous. A non-continuous text portion may have one or more template placeholders 104 interposed within the text portion 102. An application, when generating an outgoing message to a user, can insert customized content in place of a template placeholder 104. The application can then generate the outgoing message using the customized content and the text portion 102. As can be appreciated, message templates 100 typically adhere to a predetermined syntax so as to allow the application to parse the message template 100 and to generate the outgoing message from the message template 100. For instance, a message template 100 may include delimiters 108 to indicate that a different section of the message template 100 is being analyzed. The syntax used may be defined by open source standards, such as the "International Components for Unicode" standard, or may be defined by proprietary standards developed by the application provider.

In the example shown in FIG. 1, the first template placeholder 104 is for a data type of "PERSON_NAME" and the second template placeholder 104 is for a data type of "COUNTRY_NAME". The text portion 102 of the example recites "traveled to." In operation, an application utilizing the message template 100 may receive a name of a person, e.g. "Michael," and a name of a country, e.g., "Egypt." When provided with the foregoing input, e.g. "Michael" and "Egypt" as a "PERSON_NAME" and "COUNTRY_NAME," respectively, the application can generate a message stating "Michael traveled to Egypt." It is appreciated that a message can be provided to a user in any suitable fashion. For instance, the application can present the message for display on a webpage, send the message to the user's email, and/or send the message to a mobile device of the user, e.g., short message service (SMS) message.

As discussed above, application providers want to reach as many users as possible. Thus, application providers may utilize translators to translate the message templates 100 from a source language to one or more target languages. As should be appreciated from the example provided above, the syntax of the message template 100 can include delimiters 108. Delimiters 108 may be braces, parenthesis, brackets, or other syntactical characters which allow the application to parse and generate the message. The delimiters 108, however, present a problem to human translators, who are typically unfamiliar with the predetermined syntax implemented by an application. As should be appreciated, the translator may erroneously forget to close all braces in the message template 100, or may otherwise enter the text of the template placeholders 104 incorrectly. Syntactical errors in message templates 100 may result in a runtime error when the application is executing and attempts to generate an outgoing message using a message template 100 containing a syntactical error.

Figure 2:
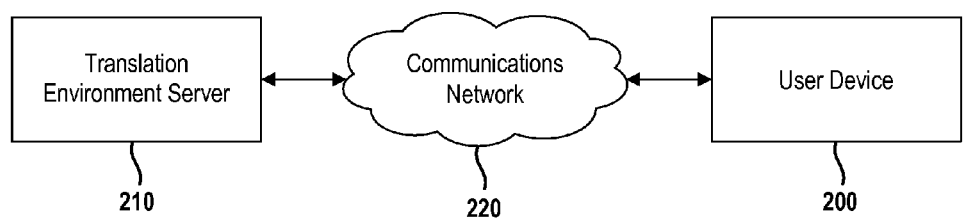
FIG. 2 is a block diagram illustrating an example environment of a translation environment server according to some embodiments of the present disclosure.

FIG. 2 illustrates an example technique for allowing a translator to perform translation of message templates 100. The technique may be implemented as a translation environment server 210 in communication with a user device 200. The user device 200 and the translation environment 210 may communicate over a communication network 220, such as the Internet or an intranet. The user device 200 may be any suitable device including but not limited to a desktop computer, a laptop computer, a tablet device, a smart phone, or a mobile phone. The translation environment server 210 may be any suitable device comprised of one or more processors that execute computer-readable instructions. The translation environment server 210 provides for display at the user device 200 an environment for performing translation of message templates 100. The translation environment server 210 may implement a graphical user interface (GUI) which allows the translator to view the message templates 100 that are to be translated and to provide input corresponding to translated message templates, which are described in greater detail below.

Figure 3:
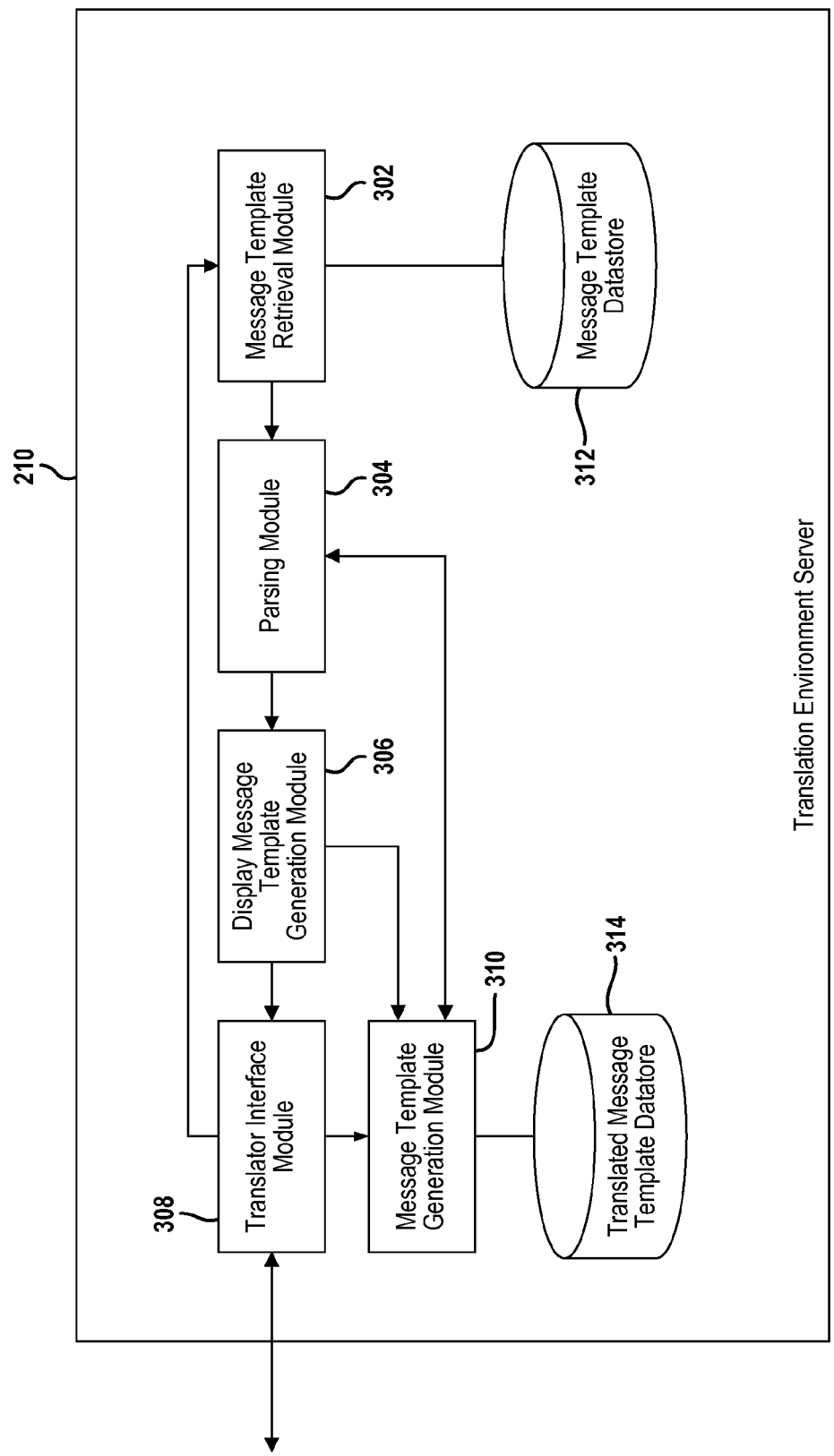
FIG. 3 is a block diagram illustrating example components of a translation environment server according to some embodiments of the present disclosure.

FIG. 3 illustrates an example of the translation environment server 210. The translation environment server 210 can include a message template retrieval module 302, a parsing module 304, a display message template generation module 306, a translator interface module 308, and a message template generation module 310. The translation environment server 210 may further include a message template datastore 312 and a translated message template datastore 314. It is appreciated that the message template datastore 312 and the translated message template datastore 314 may be a single datastore, but for explanatory purposes, the translation environment server 210 is described as having the message template datastore 312 and a translated message template datastore 314.

The message template datastore 312 stores a plurality of message templates 100 that are to be translated. The message template datastore 312 receives the plurality of message templates 100 from a message source, such as an application provider. As will be discussed below, when a translator accesses the translation environment server 210, he or she may be provided with one or more of the plurality of message templates 100 to translate from a source language into a target language.

The message template retrieval module 302 retrieves one or more of the plurality of message templates 100 from the message template datastore 312. The message templates 100 that are retrieved from the message template datastore 312 are to be translated by the translator from a source language to one or more target languages. The message template retrieval module 302 may retrieve the one or more message templates 100 upon the occurrence of an event, such as the translator accessing the translation environment server 210 or the translator explicitly requesting one or more message templates 100. The translator can access the translation environment server 210 in any suitable fashion. For instance, the translator can log onto the translation environment server 210 by accessing a particular network address and providing authentication information such as a username and password. Similarly, the translator can request one or more message templates 100 to translate. The message template retrieval module 302 may obtain the one or more message templates 100 in any suitable fashion. For instance, the translator may be designated to translate message templates 100 from a specific language, to a specific language, and/or from a specific message template source. In this example, the message template retrieval module 302 can retrieve any message templates 100 that fit the criteria of the translator or which have been specifically assigned to or requested by the translator.

Once the message template retrieval module 302 has retrieved the one or more message templates 100, the message template retrieval module 302 provides the one or more message templates 100 to the parsing module 304. The parsing module 304 may be implemented as part of the translation environment server 210 or may be implemented as a stand-alone component such that the parsing module 304 can be accessed over the communications network 220 such as the Internet.

The parsing module 304 can be configured to receive one message template 100 at a time, or may receive a plurality of message templates 100. In either case, the parsing module 304 analyzes the message template 100 that is to be parsed and identifies the text portion 102 and the one or more template placeholders 104 contained in the message template 100. The parsing module 304 can operate in any suitable fashion. Many applications that use message templates 100 to display messages to a user utilize parsing algorithms to parse the message templates 100. It is appreciated that any of these parsing algorithms can be implemented by the parsing module 304.

In some embodiments, an example technique implemented by the parsing module 304 analyzes the message template 100 by locating delimiters 108 in relation to other delimiters 108. For example, in the message template 100 depicted in FIG. 1, the delimiters 108 are braces, e.g. "{" and "}." For purposes of explanation, the "{" delimiter 108 is referred to as an "open brace," and the "}" delimiter 108 is referred to as a "close brace." In this example technique, the parsing module 304 can analyze the message template 100 from left to right. Each time an open brace is encountered, a counter is incremented. When the parsing module 304 encounters a close brace after an open brace, the parsing module 304 identifies the content between the open brace and the close brace as template placeholder 104. Each time a close brace is encountered, the counter is decremented. It should be appreciated that the counter merely indicates how many open braces are yet to be unmatched with a close brace at a given time. When the parsing module 304 decrements the counter twice in a row, e.g., encounters two close braces consecutively, the counter determines that the text portion 102 is the text contained between the second close brace and its matching open brace but excluding any identified template placeholders 104 interposed within the text portion 102.

Figure 4:
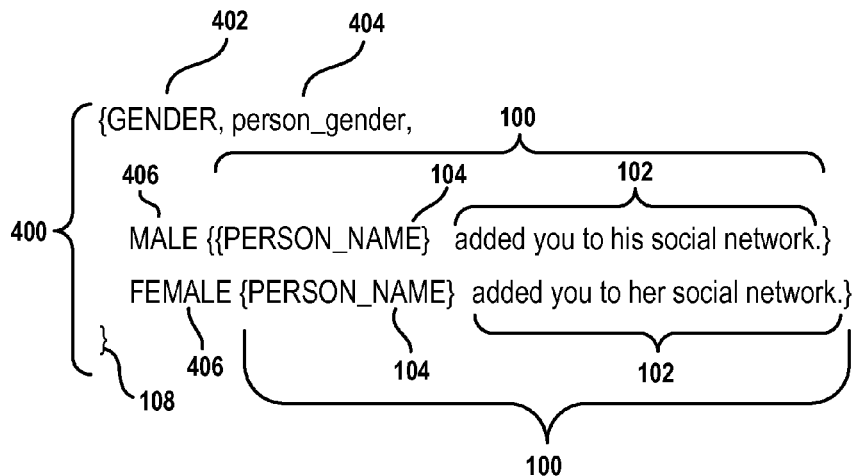
FIG. 4 is an illustration of an example of a complex message template according to some embodiments of the present disclosure.

It is appreciated that the parsing module 304 may be further configured to parse more complex message templates. FIG. 4 illustrates an example of a complex message template 400. In the example, a complex message template 400 may include one or more message templates 100 and handling data. The handling data may include a message type 402, a message type variable 404, and/or one or more indicators 406. Each indicator 406 is associated to one of the one or more message templates 100, such that the indicator 406 imparts information relating to the message template to which it is associated.

In the example provided in FIG. 4, the complex message template 400 provides alternate message templates for different genders. Thus, the message type 402 indicates that the complex message template 400 is differentiated by gender. An application displaying the message receives a message type variable 404, e.g., person_gender, and selects which message template 100 to use when generating a customized message based on the received message type variable 404. The indicators 406 indicate to which gender, e.g. "MALE" or "FEMALE," the corresponding message template 100 associates. Thus, if person_gender is equal to MALE, the first message template 100 is used to generate a first message corresponding to a male, and if person_gender is equal to FEMALE, the second message template 100 is used to generate a second message corresponding to a female. It should be appreciated that the foregoing is provided for example only and not intended to limit the scope of the disclosure.

As should be appreciated, the translator should not translate portions of a complex message template 400 that are not part of the one or more message templates 100—that is, the translator does need not translate the handling data. Thus, the parsing module 304 is configured to identify the one or more message templates 100 in the complex message template 400. The identified message templates 100 are then parsed in the manner described above. As will be described further below, the message template generation module 310 can generate a translated complex message template by substituting translated message templates in place of the message templates 100 contained in the complex message template 400.

The display message template generation module 306 can receive the parsed elements of the message template 100, e.g., the text portion 102 and the one or more template placeholder 104, and generate one or more non-editable objects corresponding to the one or more template placeholders 104. The display message template generation module 306 substitutes each non-editable object in place of its corresponding template placeholder 104 with a corresponding template place holder 104, thereby generating a display message template.

Figure 5:
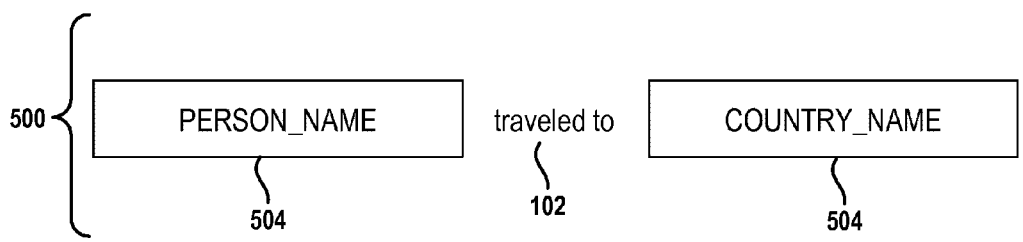
FIG. 5 is an illustration of an example of a display message template according to some embodiments of the present disclosure.

FIG. 5 illustrates an example of a display message template 500. An example display message template 500 is comprised of the text portion 102 and one or more non-editable objects 504. The text portion 102 in the display message template 500 is the text portion 102 of the message template 100. A non-editable object 504 is an object or icon that represents the corresponding template placeholder 104. The non-editable object 504 may be a textual graphic, such as the string of characters contained in the corresponding template placeholder 104, in a predetermined geometry such as a box. It is appreciated that other icons can be used as well, such as pictographs, drawings, photographs, or the like.

The display message template generation module 306 may be configured to associate each non-editable object 504 with its corresponding template placeholder 104. As will be described in greater detail below, the association between a non-editable object 504 and a template placeholder 104 is used to substitute the template placeholder 104 for the non-editable object 504 when generating a display message template 500.

The display message template generation module 306 can generate the non-editable objects 504 in any suitable fashion. For example, the display message template generation module 306 can create a .GIF or .JPEG file containing the string of characters that are identified in the template placeholder 104. Further, the display message template generation module 306 can highlight the text in the .GIF or .JPEG so the string of characters appear to be highlighted in color, e.g., orange or blue. It is appreciated that any other suitable means for generating a non-editable object 504 may be implemented by the display message template 500.

Once the display message template generation module 306 has generated one or more non-editable objects 504, the display message template generation module 306 generates the display message template 500. The display message template generation module 306 can generate computer readable code, such as XML code or HTML code, which contains the display message template 500. The computer readable code containing the display message template 500 can be generated in any suitable manner. It is appreciated that for a complex message template 400, the display message template generation module 306 can generate two or more display message templates 500 corresponding to the complex message template 400, which may be displayed to the translator concurrently.

Figure 6:
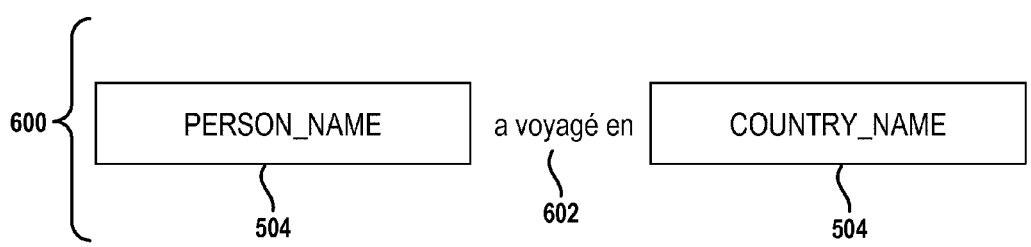
FIG. 6 is an illustration of an example of a translated display message template according to some embodiments of the present disclosure.

The display message template generation module 306 provides the computer readable code, including the display message template 500 embedded therein, to the translator interface module 308. The translator interface module 308 provides a GUI to the user device 200. The translator interacts with the translation environment server 210 from the user device 200 using the provided GUI in order to provide a translated display message template to the translation environment server 200. FIG. 6 illustrates an example of a translated display message template 600. The translated display message template 600 is comprised of a translated text portion 602 and one or more non-editable objects 504. The translated display message template 600 is entered by the translator such that the translator provides the translated text portion 602 and inserts the one or more non-editable objects 504 into the translated text portion 602.

FIGS. 7A-C illustrate an example of a GUI 700 in operation. The GUI 700 can be displayed at the user device 200. For example, the GUI 700 may be displayed by a web browser executing at the user device 200. It is further noted, that the GUI 700 is generated and provided for display by the translator interface module 308. The GUI 700 that is provided for display includes a first portion 702, a second portion 704, a third portion 706, and a fourth portion 708. The first portion 702 displays the display message template 500. The second portion 704 displays an input area, where the translator can provide text input or can insert a non-editable object 504. The third portion 706 displays the available non-editable objects 504. The fourth portion 708 displays instructions, e.g., a CANCEL button 710 and a SUBMIT button 712.

In FIG. 7A, the GUI 700 is displaying the display message template 500 in the first portion 702. The translator has translated the text portion 102 of the display message template 500 into a translated text portion 602. The translator provides the translated text portion 602 in the second portion 704 using an input device, such as a keyboard. In the example, the translator has translated the text portion 102 reciting "traveled to" to a translated text portion 602 reciting "a voyagé en." In this example, the source language is English and the target language is French. It is noted that both the source language and target language can be any of the written languages, including languages that are written from right to left and from left to right.

In FIG. 7B, the translator has inserted one of the non-editable objects 504 into the second portion 704. In some embodiments, the GUI 700 allows the translator to select and move the non-editable object 504 into the second portion 704 of the GUI 700. The translator further select the position of the non-editable object 504 in relation to the characters or words in the translated text portion 602. In FIG. 7C, the translator has inserted another non-editable object 504 into the second portion 704. It should be appreciated that the translator has inserted the non-editable object 504 which recites "COUNTRY_NAME" into the translated text portion 602.

Once the translator has entered the translated text portion 602 and has inserted the non-editable objects 504, the translator can submit the translated display message template 600 to the translation environment server 210. In the example provided, the translator can click on the SUBMIT button 712.

Referring back to FIGS. 2 and 3, the translator interface module 308 receives the translated display message template 600 from the user device 200, upon the translator submission thereof. The translator interface module 308 provides the translated display message template 600 to the message template generation module 310, which generates a translated message template therefrom.

FIG. 8 illustrates an example of a translated message template 800. The translated message template 800 may include a translated text portion 602 and one or more template placeholders 104. As can be appreciated from FIG. 1, the one or more template placeholders 104 in the translated message template 800 can be the template placeholders 104 from the original message template 100.

The message template generation module 310 may be configured to receive from the display message template generation module 306, template placeholders 104 that have been associated to non-editable objects 504 contained in the received translated display message template 600. For each non-editable object 504 in a translated display message template 600, the message template generation module 310 replaces the non-editable object 504 with its associated template placeholder 104, thereby resulting in a translated message template 800. The message template generation module 310 can store the translated message template 800 in the translated message template datastore 314. As previously mentioned, the translated message template datastore 314 and the message template datastore 312 may be implemented as a single datastore.

In the case that the message template 100 to be translated was a complex message template 400, the message template generation module 310 can generate a complex translated message template. FIG. 9 illustrates a complex translated message template 900. The complex translated message template 900 can include the handling data, as described with respect to FIG. 4 and one or more translated message templates 800. The handling data may include a message type 402, a message type variable 404, and/or one or more indicators 406. Each indicator 406 is linked to one of the one or more translated message templates 800.

When generating a complex translated message template 900, the message template generation module 310 receives the translated message templates 800 from the translator interface module 308, the handling data of the complex message template 400 from the parsing module 304, and the template placeholders 104 from the display message template generation module 306. The message template generation module 310 generates one or more translated message templates 800 in the manner which was described above. As described above, each message template 100 in a complex message template 400 is linked to an indicator 406. The message template generation module 310 uses the links between indicators 406 and the message templates 100, determined by the parsing module 304, to link the translated message templates 800 to the indicators 406. Upon linking the indicators 406 to the translated message templates 800, the message template generation module 310 can generate the complex translated message template 900. The complex translated message template 900 can be stored in the translated message template datastore 314.

It should be appreciated that the components described with respect to the translation environment server 210 are provided for example. It is noted that some of the components may be implemented at the user device 200. For example, the message template retrieval module 302, the parsing module 304, the display message template generation module 306, and/or the message template generation module 310 may be implemented at the user device 200 such that the user device 200 receives message templates 100 to be translated and returns translated message templates 800.

FIGS. 10A-B illustrate an exemplary technique for performing translation of message templates. At 1002, the message template retrieval module 302 retrieves the message template 100 to be translated from the message template datastore 312. As previously mentioned, the message template retrieval module 302 may receive input from a user, e.g., a translator, requesting the message template 100 to translate.

The retrieved message template 100 is analyzed by the parsing module 304 to determine if the message template 100 is a complex message template 400, as shown at 1004. If the message template 100 is not a complex message template 400, the parsing module 304 parses the message template 100 and identifies the text portion 102 and the one or more template placeholders 104, as shown at 1006.

The display message template generation module 306 receives the text portion and the one or more template placeholders 104, and generates one or more non-editable objects 504 based on the one or more template placeholders 104, as shown at 1008. As previously discussed, a non-editable object 504 can be a graphic representing the string of characters contained in the corresponding template placeholder 104. Further, the display message template generation module 306 can associate each non-editable object 504 to its corresponding template placeholder 104.

At 1010, the display message template generation module 306 can generate a display message template 500 by inserting the one or more non-editable objects 504 into the text portion 102 in place of the one or more template placeholders 104. The display message template 500 is provided for display at the user device 200 by the translator interface module 308, as shown at 1012. As was previously discussed, the translator interface module 308 may generate computer readable code having the display message template 500 embedded therein. The computer readable code may be communicated to the user device 200 via the communication network 220. A web browser or other application executing on the user device 200 can execute the computer readable code and display a GUI 700 containing the display message template 500. The translator can interact with the GUI 700 to enter a translated text portion 602 and to insert the non-editable objects 504 therein. The translator arranges the translated display message template 600 to his or her approval and submits the display message template 500. The translated display message template 600 may be communicated via the communication network 220 to the translation environment server 210.

The translator interface module 308 can receive the translated display message template 600, as shown at 1014. The message template generation module 310 can generate a translated message template 800 from the received translated display message template 600, as shown at 1016. The message template generation module 310 replaces the non-editable objects 504 embedded in the translated display message template 600 with the template placeholders 104 from the message template to be translated, thereby generating the translated message template 800. Once the translated message template 800 has been generated, the message template generation module 310 stores the translated message template 800 in the translated message template datastore 314, as shown at 1018.

Referring back to 1004, if the message template 100 is determined to be a complex message template 400, then the complex message template 400 is divided into one or more message templates 100, as shown at 1022 (FIG. 10B). The parsing module 304, as described above, identifies the one or more message templates 100 in a complex message template 400. The identified one or more message templates 100 are then parsed to identify the text portions 102 and the one or more template placeholders 104 in each message template 100, as shown at 1024.

At 1026, the display message template generation module 306 generates one or more non-editable objects for each of the one or more template placeholder 104. It should be appreciated that in some complex message templates 400 having two or more message templates 100 contained therein, the same template placeholders 104 may be used in the two or more message templates 100. Thus, the display message template generation module 306 can generate one non-editable object 504 that can be used in multiple display message templates 500. The display message template generation module 306 uses the non-editable objects 504 to generate one or more display message templates 500, as shown at 1028.

At 1030, the one or more display message templates 500 are provided for display at the user device 200. It should be appreciated that because of the nature of a complex message template 400, the one or more display message templates 500 may be presented to the translator concurrently. Thus, the translator interface module 308 can generate computer readable code containing the one or more display message templates 500, which is transmitted to the user device 200 via the communication network 220.

As previously discussed, the translator interface module 308 receives one or more translated display message templates 600 from the user device, as shown at 1032. Based on the one or more translated display message templates 600, the message template generation module 310 generates a complex translated message template 900, as shown at 1034. The complex translated message template 900 may then be stored in the translated message template datastore 314, as shown at 1036.

Referring back to FIG. 10A, once a translated message template 800 or a complex translated message template 900 has been generated and stored, the message template retrieval module 302 determines whether the translator has any remaining message templates 100 to generate, as shown at 1020. If so, the technique described above is repeated until the translator does not have any additional message templates 100 to translate.

It should be appreciated that the foregoing technique is provided as an example, and that variations thereof are contemplated and within the scope of the disclosure. Further, it should be appreciated that the stages described above may be divided into multiple stages.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:

receiving, at a computing device having one or more processors, a message template to be translated from a source language to a target language, the message template including a text portion and one or more template placeholders, whereby the message template is used to generate a customized output message by replacing the one or more template placeholders with customized content;

parsing, at the computing device, the message template to identify the text portion and the one or more template placeholders;

generating, at the computing device, one or more non-editable objects, each of the one or more non-editable objects corresponding to one of the one or more template placeholders;

associating each one of the one or more non-editable objects to its corresponding template placeholder of the one or more template placeholders;

generating, at the computing device, a display message template by replacing each of the one or more template placeholders with its associated non-editable object in the message template, the display message template including the text portion to be translated;

providing, from the computing device, the display message template to a user device;

providing, for display at the user device, an environment that includes a first portion that displays the display message template, including the one or more template placeholders, and a second portion that receives text input from the user, wherein the user enters a translated text portion at the second portion, the translated text portion being in the target language and corresponding to the text portion.

receiving, at the computing device, a translated display message template from the user device, the translated message including the translated text portion and the one or more non-editable objects; and generating, at the computing device, a translated message template based on the translated display message template, the translated message template including the translated text portion and the one or more template placeholders.

2. A computer-implemented method comprising:

receiving, at a computing device having one or more processors, a message template to be translated from a source language to a target language, the message template including a text portion and one or more template placeholders, whereby the message template is used to generate a customized output message by replacing the one or more template placeholders with customized content;

parsing, at the computing device, the message template to identify the text portion and the one or more template placeholders;

generating, at the computing device, one or more non-editable objects, each of the one or more non-editable objects corresponding to one of the one or more template placeholders;

generating, at the computing device, a display message template by replacing each of the one or more template placeholders with its corresponding non-editable object in the message template, the display message template including the text portion to be translated;

providing, from the computing device, the display message template to a user device;

receiving, at the computing device, a translated display message template from the user device, the translated message including a translated text portion and the one or more non-editable objects, the translated text portion being in the target language and corresponding to the text portion of the message template; and generating, at the computing device, a translated message template based on the translated display message template, the translated message template including the translated text portion and the one or more template placeholders.

3. The method of claim 2, further comprising providing, for display at the user device, an environment that includes a first portion that displays the display message template, including the one or more template placeholders, and a second portion that receives text input from the user, wherein the user enters the translated text portion at the second portion.

4. The method of claim 3, further comprising allowing the user to slide the one or more non-editable objects from the display message template in the first portion into the translated text portion entered by the user in the second portion to create the translated display message template.

5. The method of claim 3, further comprising providing for display in the environment a third portion that displays one or more duplicate non-editable objects corresponding to each one of the one or more non-editable objects in the display message template, the duplicate non-editable objects being substantially equivalent to the one or more non-editable objects.

6. The method of claim 5, further comprising allowing the user to slidably insert the duplicate non-editable objects from the third portion of the environment into the text input received at the second portion, thereby creating the translated display message template that is received at the one or more processors.

7. The method of claim 2, further comprising associating each one of the one or more non-editable objects to its corresponding template placeholder of the one or more template placeholders.

8. The method of claim 5, wherein generating the translated message template further comprises replacing each of the one or more non-editable objects in the translated display message template with its associated template placeholder in the translated message resulting in a translated message template.

9. The method of claim 2, wherein the translated message template is used to generate a translated customized message in the second language by replacing the one or more template placeholders with the customized content.

10. The method of claim 2, wherein the parsing the message template further comprises providing the message template to a parsing engine and receiving the text portion and the one or more template placeholders from the parsing engine.

11. The method of claim 2, wherein parsing the message template further comprises determining whether the message template is a compound message, and if so, generating a plurality of message templates from the message template, wherein each of the plurality of message templates is individually translated by the translator.

12. A system comprising:

a message template datastore that stores a plurality of message templates to be translated;

a message template retrieval module that retrieves a message template to be translated of the plurality of message templates to be translated from the message template datastore, wherein the message template is to be translated from a source language to a target language, and includes a text portion and one or more template placeholders;

a parsing module that parses the message template to be translated to identify the text portion and the one or more template placeholders;

a display message template generation module that generates one or more non-editable objects, each of the one or more non-editable objects corresponding to one of the one or more template placeholders, and generates a display message template by replacing each of the one or more template placeholders with its corresponding non-editable object in the message template, the display message template including the text portion;

a translator interface module that provides for display at a user device the display message template, and that receives a translated display message template from the user device, the translated message including a translated text portion and the one or more non-editable objects, the translated text portion being in the target language and corresponding to the text portion of the message template to be translated; and a message template generation module that generates a translated message template based on the translated display message template and the one or more template placeholders, the translated message template including the translated text portion and the one or more template placeholders.

13. The system of claim 12, wherein the translator interface module is further configured to provide for display at the user device, an environment that includes a first portion that displays the display message template, including the one or more template placeholders, and a second portion that receives text input from the user, wherein the user enters the translated text portion at the second portion.

14. The system of claim 13, wherein the translator interface module is further configured to allow the user to slide the one or more non-editable objects from the display message template in the first portion into the translated text portion entered by the user in the second portion to create the translated display message template.

15. The system of claim 13, wherein the translator interface module is further configured to provide for display in the environment, a third portion that displays one or more duplicate non-editable objects corresponding to each one of the one or more non-editable objects in the display message template, the duplicate non-editable objects being substantially equivalent to the one or more non-editable objects.

16. The system of claim 15, wherein the translator interface module is further configured to allow the user to slidably insert the duplicate non-editable objects from the third portion of the environment into the text input received at the second portion, thereby creating the translated display message template.

17. The system of claim 12, wherein the display message template generation module is further configured to associate each one of the one or more non-editable objects to its corresponding template placeholder of the one or more template placeholders.

18. The system of claim 17, wherein the message template generation module generates the translated message template by replacing each of the one or more non-editable objects in the translated display message template with its associated template placeholder in the translated message, thereby resulting in a translated message template.

19. The system of claim 12, wherein the parsing module is further configured to determine whether the message template is a compound message, and if so, to generate a plurality of message templates from the message template, wherein each of the plurality of message templates is individually translated by the translator.

* * * * *